April 27, 1965
L. E. FELDHAKE
3,181,038
CONTROL CIRCUIT FOR SWITCHING DEVICE
Filed Nov. 15, 1961
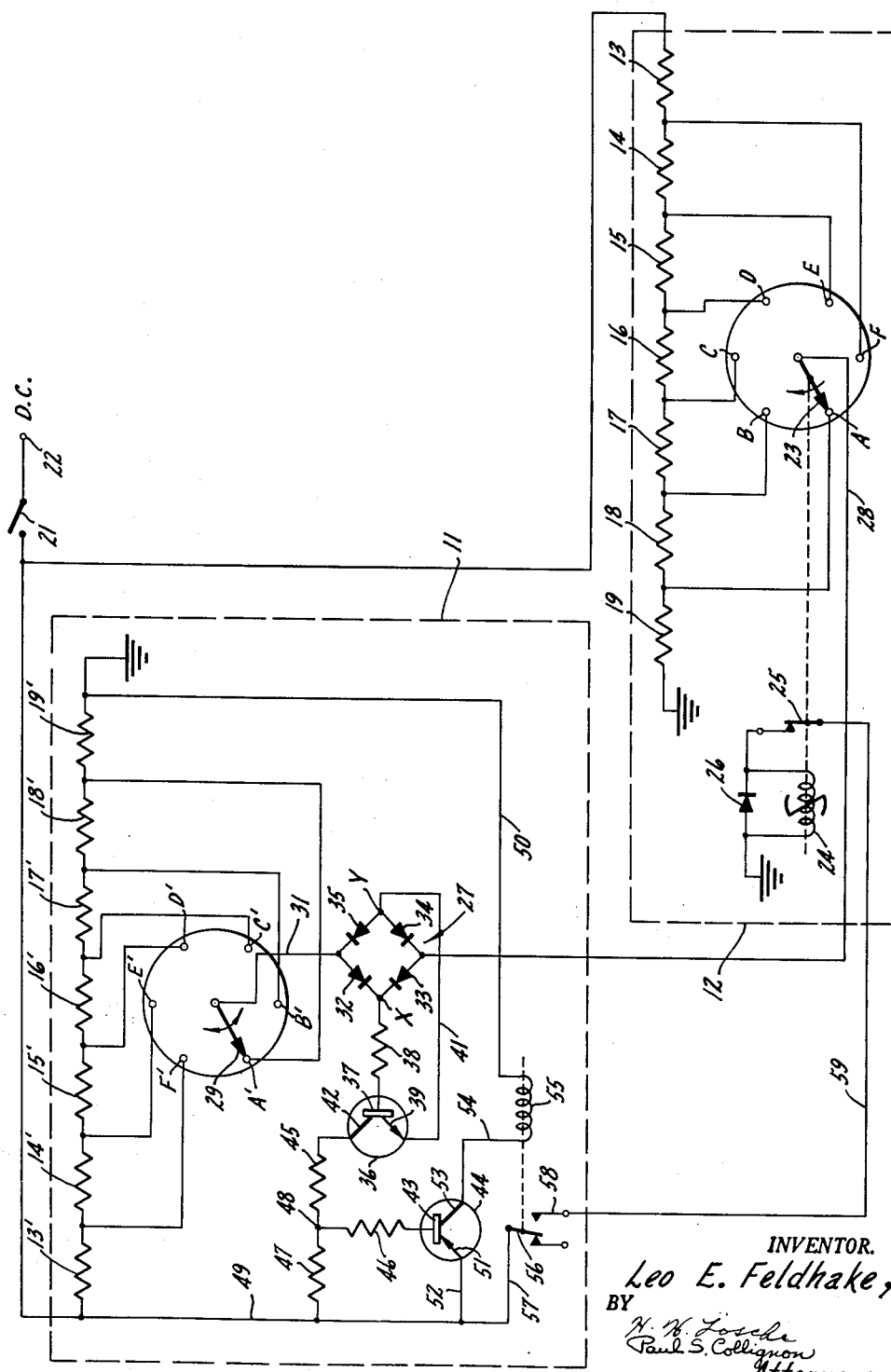
INVENTOR.
Leo E. Feldhake,
BY
*H. K. Losche*
*Paul S. Collignon*
Attorneys.

United States Patent Office 3,181,038
Patented Apr. 27, 1965

3,181,038
CONTROL CIRCUIT FOR SWITCHING DEVICE
Leo E. Feldhake, Indianapolis, Ind., assignor to the United States of America as represented by the Secretary of the Navy
Filed Nov. 15, 1961, Ser. No. 152,692
3 Claims. (Cl. 317—153)
(Granted under Title 35, U.S. Code (1952), sec. 266)

The invention described herein may be manufactured and used by or for the Government of the United States of America for governmental purposes without the payment of any royalties thereon or therefor.

The present invention relates to a control circuit and more particularly to a control circuit for remotely controlling a rotary switch.

There is frequently a need for controlling a switch or other device from a remote location. For example, it is often necessary that a pilot of an aircraft be able to "switch in" various parameters in armament weapons for changing tactical situations. As most armament weapons are located in a remote place from the pilot's cockpit position, it is necessary that a control circuit be provided in order to accomplish the desired switching.

In the present invention, a rotary solenoid is provided to drive a gang of rotary, wafer-type switches in response to a remotely positioned control switch. Upon movement of the control switch, an unbalanced voltage condition is created, and a pair of transistors are made to conduct and, in turn, actuate a relay which permits the rotary solenoid to be energized. The rotary solenoid rotates the gang of rotary switches until a balanced voltage condition is reached. A bridge rectifier is provided in order to insure a polarized signal to the transistors.

It is therefore a general object of the present invention to provide a remote control of a rotary switch.

Another object of the present invention is to provide a control system that will have a minimum number of movable parts and will require little, if any, maintenance.

Still another object of the present invention is to provide a control system in which the control switch can be turned in either direction and still provide a polarized signal to a transistor.

Other objects and advantages of the present invention will be readily appreciated as the same becomes better understood by reference to the following detailed description when considered in connection with the accompanying drawing, in which the figure is a schematic diagram of a control system.

Referring now to the drawing, there is shown a control unit 11 and a follower unit 12 which is remotely positioned from the control unit. By way of example, control unit 11 might be positioned in the cockpit of an aircraft and follower unit 12 might be positioned in a weapon, such as a bomb or a torpedo. A plurality of resistors 13 through 19 are provided in the follower unit 12, and these resistors are connected in series through switch 21 to a source of direct current 22. A plurality of terminals, which are designated A through F are provided, and each terminal is connected to a pair of resistors, as shown. Switch contact 23 is rotatably driven by rotary solenoid 24, when solenoid 24 is energized, and during the travel of contact 23 from one terminal to another, switch 25 is actuated to cut off the flow of current to solenoid 24. Thus solenoid 24 acts as a stepping relay. Rectifier 26 is connected in parallel with the solenoid coil 24 in order to suppress peak surges of current.

A plurality of resistors 13' to 19', corresponding in resistance values to resistors 13 to 19, respectively, are provided in control unit 11. Likewise, a plurality of terminals A'–F', corresponding to terminals A–F, are connected to resistors 13' to 19', as shown. Resistors 13' to 19' are connected in series to the source of direct current 22. Switch contact 23 is connected to bridge rectifier 27 through lead 28, and switch contact 29, which is in control unit 11 and mechanically operated, is connected to bridge rectifier 27 through lead 31.

Bridge rectifier 27, which is comprised of four crystal rectifiers 32 through 35 is provided to insure a polarized signal to transistor 36, regardless of the respective positions of switch contacts 23 and 29. The base electrode 37 of transistor 36 is connected to junction point X of bridge rectifier 27 through the current limiting resistor 38 and the emitter electrode 39 is connected to the junction point Y of the bridge rectifier through lead 41. The collector electrode 42 of transistor 36 is connected to the base electrode 43 of a second transistor 44 through biasing resistor 45 and current limiting resistor 46. A second biasing resistor 47 is provided for transistor 44 and has one end connected to junction point 48 and the other end connected through lead 49 to the direct current source 22.

The emitter electrode 51 of transistor 44 is connected through leads 52 and 49 to the direct current source 22, and the collector electrode 53 is connected through lead 54 to one end of relay coil 55 of a relay. The other end of relay coil 55 is connected through lead 50 to ground. The armature 56 of the relay is connected through leads 57 and 49 to the direct current source 22 and stationary contact 58 is connected through lead 59 to switch 25.

In operation, assuming that switch 21 is closed and switches 23 and 29 are at positions A and A', respectively, it can be seen that the voltage drop between switch 23 and ground is equal to the voltage drop between switch 29 and ground, and consequently there is no potential across points X and Y of bridge rectifier 27 and no current flows out of bridge rectifier 27. As no current is flowing into transistor 36, transistor 44 is biased off and thus no current is flowing through relay coil 55 and the relay is opened.

Assuming now that switch 29 is manually moved to position B', the voltage drop between switch 29 and ground is greater than the voltage drop between switch 23 and ground. This results in a voltage difference being applied to bridge rectifier 27 and current flows through rectifier 32, junction point X, base 37, and emitter 39 of transistor 36, lead 41, junction point Y, rectifier 34, and then through lead 28 to switch 23 and ground. When transistor 36 is turned on, transistor 44 is also turned on and there is a flow of current from source 22 through emitter 51 and collector 53, and then through lead 54, relay coil 55, and lead 50 to ground. When relay coil 55 is energized, armature 56 is actuated into contact with stationary contact 58, and current flows from the direct current source 22 through armature 56, stationary contact 58, lead 59, and then to switch 25 to actuate the rotary solenoid 24 which, in turn, drives switch contact 23 in a clockwise direction toward position B. Before switch contact 23 reaches position B, switch 25 is opened for a short period and thus the current to rotary solenoid 24 is cut off temporarily. When switch contact 23 fully reaches position B, contact 25 has been closed, however, as the voltage drops between contact 29 and ground, and contact 23 and ground, are again equal, the current through the relay coil 55 is cut off and armature 56 is returned to its normally off position. Thus it can be seen that contact 23 is positioned by the manual movement of contact 29.

With contact 23 in the B position and contact 29 in the B' position, if contact 29 is moved back to the A' position, it can be seen that the voltage drop between switch 23 and ground is now greater than the voltage drop between switch 29 and ground. However, a proper polarized signal is still provided to transistor 36 due to the function of the bridge rectifier 27. The flow of current will be from voltage source 22, through contact 23, lead 28, rectifier 33, base 37 and emitter 39 of transistor 36, lead 41, rectifier 35, lead 31, and switch 29 to ground. As before, when transistor 36 is turned on, transistor 44 is also turned on, and relay coil 55 is energized and, in turn, armature 56 is actuated to energize rotary solenoid 24. As rotary solenoid 24 drives in only one direction, switch arm 23 is moved to position C. However, a voltage balance is not obtained, and consequently switch arm 23 will then move on around, one step at a time, until position A is reached.

It can thus be seen that the present invention provides a control system for positioning the contact arm of a remotely positioned switch.

Obviously many modifications and variations of the present invention are possible in the light of the above teachings. It is therefore to be understood, that within the scope of the appended claims, the invention may be practiced otherwise than as specifically described.

What is claimed:
1. A circuit for controlling the positioning of a multiposition remotely located switch means comprising:
 a source of direct current potential;
 a first plurality of resistors coupled in series to said source of direct current potential;
 a second plurality of resistors remotely positioned from said first plurality of resistors and coupled in series to said source of direct current potential;
 a first manually positionable rotary switch means having a movable contact arm and a plurality of contact positions, one each of said contact positions being coupled to one end of a respective resistor of said first plurality of resistors;
 a second rotary switch means having a movable contact arm and a plurality of contact positions corresponding to said plurality of contact positions of said first rotary switch means, one each of said contact positions being coupled to one end of a respective resistor of said second plurality of resistors;
 an electrical rotation means coupled to said movable contact arm of said second rotary switch means and capable of rotating that said movable contact arm from any one of said plurality of contact positions thereof to any other one of said positions in response to electrical signals applied to said rotation means; and
 solid state electronic control means coupled between said movable contact arm of said first manually positionable rotary switch means and said movable contact arm of said second rotary switch means to sense any change in location of said movable arm of said first switch means with respect to its said plurality of contact positions and to provide said electrical signals to said electrical rotation means to cause it to position said movable contact arm of said second rotary switch means in the corresponding one of its said plurality of contact positions.

2. A circuit for controlling the positioning of a multiposition remotely located switch means as set forth in claim 1 wherein said solid state electronic control means comprises
 first and second transistor means, bridge rectifier means, and electrical relay means for providing properly polarized said electrical signals to said rotation means without regard to the direction of change of position of said movable contact arm of said first manually positionable rotary switch means.

3. A circuit for controlling the positioning of a remotely located multiposition switch means comprising:
 a source of direct current potential;
 a first plurality of resistors coupled in series to said source of direct current potential;
 a second plurality of resistors remotely positioned from said first plurality of resistors and coupled in series to said source of direct current potential;
 a first rotary switch means having a first movable contact arm and a first plurality of contact position one each of said first plurality of contact positions being coupled to one end of a respective resistor of said first plurality of resistors;
 a second rotary switch means having a second movable contact arm and a second plurality of contact positions corresponding to said first plurality of contact positions of said first rotary switch means, one each of said second plurality of contact positions being coupled to one end of a respective resistor of said second plurality of resistors;
 an electrical rotation means coupled to said second movable contact arm and capable of rotating said second arm from any one of said second plurality of contact positions to any other one of said positions in response to properly polarized electrical control signals applied to said rotation means;
 a four-terminal bridge rectifier means having a first pair of opposite terminals coupled between said first movable contact arm and said second movable contact arm;
 a first transistor means having its base electrode resistively coupled to one terminal of the other pair of opposite terminals of said bridge rectifier, having its emitter electrode coupled to the other terminal of said other pair of opposite terminals, and having its collector electrode resistively coupled to said source of direct current potential;
 a second transistor means having its base electrode resistively coupled to said collector electrode of said first transistor means, and having its emitter electrode coupled to said source of direct current potential; and
 an electromagnetic relay having its coil coupled between the collector electrode of said second transistor means and ground potential, having its movable contact coupled to said source of direct current potential, and having its fixed contact coupled to said electrical rotation means, said bridge rectifier means, said first and second transistor means, and said relay means cooperating to sense any change in location of said first movable contact arm with respect to its said first plurality of said contact positions and to provide said properly polarized electrical control signals to said electrical rotation means to cause it to position said second movable contact arm in the corresponding one of its said second plurality of contact positions.

References Cited by the Examiner
UNITED STATES PATENTS 2,318,541 5/63 Tewksbury _____ 317—137
3,140,433 7/64 Stoffels _____ 318—21

FOREIGN PATENTS 565,985 9/58 Belgium.

SAMUEL BERNSTEIN, *Primary Examiner.*